US008798589B2

(12) United States Patent  
Smith et al.

(10) Patent No.: US 8,798,589 B2
(45) Date of Patent: Aug. 5, 2014

(54) METHOD AND SYSTEM FOR PROVISIONING WIRELESS SERVICES

(75) Inventors: Christopher Smith, Burlington (CA); Dave Kruis, Kitchener (CA); Ian Michael Patterson, Petersburg (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/586,995

(22) Filed: Aug. 16, 2012

(65) Prior Publication Data

US 2012/0309380 A1  Dec. 6, 2012

Related U.S. Application Data

(63) Continuation of application No. 11/259,270, filed on Oct. 27, 2005, now Pat. No. 8,280,354.

(51) Int. Cl.
*H04M 3/42* (2006.01)

(52) U.S. Cl.
USPC ............... 455/414.1; 455/418; 455/432.3

(58) Field of Classification Search
USPC ......... 455/418–419, 432.1, 432.3, 433, 414.1
See application file for complete search history.

(56) References Cited

U.S. PATENT DOCUMENTS

| 6,108,540 | A | 8/2000 | Sonti et al. |
| 6,810,259 | B1 | 10/2004 | Zhang |
| 2002/0055351 | A1* | 5/2002 | Elsey et al. .................. 455/414 |
| 2002/0068554 | A1* | 6/2002 | Dusse ........................... 455/419 |
| 2002/0131404 | A1 | 9/2002 | Mehta et al. |
| 2004/0102182 | A1 | 5/2004 | Reith et al. |
| 2005/0227677 | A1* | 10/2005 | Kallio ........................ 455/414.3 |
| 2007/0004380 | A1* | 1/2007 | Ylikoski ....................... 455/405 |
| 2007/0004393 | A1 | 1/2007 | Forsberg et al. |
| 2009/0068999 | A1 | 3/2009 | Chen et al. |

FOREIGN PATENT DOCUMENTS

| EP | 1351461 A1 | 10/2003 |
| EP | 1578165 A1 | 9/2005 |

OTHER PUBLICATIONS

European Patent Office, Extended European Search Report dated Mar. 23, 2006, issued in European Patent Application No. 05110118.6.
IPULSE, Response to Extended European Search Report dated Jun. 15, 2006, filed in European Patent Application No. 05110118.6.
European Patent Office, Intent to Grant dated Oct. 31, 2007 issued in European Patent Application No. 05110118.6.
IPULSE, Response to Intent to Grant dated Mar. 7, 2008, filed in European Patent Application No. 05110118.6.
European Patent Office, Decision to Grant dated Jul. 3, 2008, issued in European Patent Application No. 05110118.6.

(Continued)

*Primary Examiner* — Marcos Torres
(74) *Attorney, Agent, or Firm* — Norton Rose Fulbright Canada LLP (57) ABSTRACT

A method for provisioning wireless devices for use of services offered by a service provider on a wireless network, comprising: receiving at a provisioning system from a wireless device a wireless device identifier, the wireless device having a first subset of the services; identifying from the wireless device identifier a subscriber associated with the wireless device, the subscriber having a second subset of the services; and, if the first and second subsets conflict, enabling none, one, or both of the first and second subsets of services in accordance with conflict resolution information for the service provider.

19 Claims, 9 Drawing Sheets

(56) References Cited

OTHER PUBLICATIONS

Allen & Gledhill, Request to Amend Application Before Grant and Payment of Grant Fee filed Mar. 27, 2009 in Singapore Patent Application No. 200607458-7.

Intellectual Property Office of Singapore, Notification of Grant dated May 29, 2009 issued in Singapore Patent Application No. 200607458-7.

United States Patent and Trademark Office, Office Action dated Jun. 30, 2008, issued in U.S. Appl. No. 11/259,270.

Ogilvy Renault, Response to Office Action dated Sep. 15, 2008 filed in U.S. Appl. No. 11/259,270.

United States Patent and Trademark Office, Office Action dated Dec. 29, 2008, issued in U.S. Appl. No. 11/259,270.

Ogilvy Renault, Response to Office Action dated Jan. 28, 2009, filed in U.S. Appl. No. 11/259,270.

United States Patent and Trademark Office, Advisory Action dated Feb. 23, 2009, issued in U.S. Appl. No. 11/259,270.

Ogilvy Renault, Notice of Appeal dated Mar. 18, 2009, filed in U.S. Appl. No. 11/259,270.

Ogilvy Renault, Pre-Appeal Brief Request for Review dated Mar. 18, 2009, filed in U.S. Appl. No. 11/259,270.

United States Patent and Trademark Office, Notice of Panel Decision dated Jul. 31, 2009, issued in U.S. Appl. No. 11/259,270.

United States Patent and Trademark Office, Office Action dated Oct. 20, 2009, issued in U.S. Appl. No. 11/259,270.

Ogilvy Renault, Response to Office Action dated Jan. 20, 2010, filed in U.S. Appl. No. 11/259,270.

United States Patent and Trademark Office, Office Action dated Apr. 28, 2010, issued in U.S. Appl. No. 11/259,270.

Ogilvy Renault, Response to Office Action dated Jul. 28, 2010, filed in U.S. Appl. No. 11/259,270.

United States Patent and Trademark Office, Office Action dated Dec. 23, 2010, issued in U.S. Appl. No. 11/259,270.

Ogilvy Renault, Response to Office Action dated Mar. 17, 2011, filed in U.S. Appl. No. 11/259,270.

United States Patent and Trademark Office, Office Action dated May 23, 2011, issued in U.S. Appl. No. 11/259,270.

Norton Rose, Response to Office Action dated Jul. 22, 2011, filed in U.S. Appl. No. 11/259,270.

United States Patent and Trademark Office, Office Action dated Sep. 22, 2011, issued in U.S. Appl. No. 11/259,270.

Norton Rose, Response to Office Action dated Dec. 21, 2011, filed in U.S. Appl. No. 11/259,270.

United States Patent and Trademark Office, Office Action dated Mar. 2, 2012, issued in U.S. Appl. No. 11/259,270.

Norton Rose, Response to Office Action dated Apr. 27, 2012, filed in U.S. Appl. No. 11/259,270.

United States Patent and Trademark Office, Notice of Allowance dated May 17, 2012, issued in U.S. Appl. No. 11/259,270.

Canadian Intellectual Property Office, Examination Report dated Mar. 2, 2009, issued in Canadian Patent Application No. 2,565,402.

Ogilvy Renault, Response to Examination Report dated Aug. 27, 2009, filed in Canadian Patent Application No. 2,565,402.

Canadian Intellectual Property Office, Examination Report dated Nov. 4, 2010, issued in Canadian Patent Application No. 2,565,402.

Ogilvy Renault, Response to Examination Report dated May 2, 2011, filed in Canadian Patent Application No. 2,565,402.

Canadian Intellectual Property Office, Examination Report dated Jul. 18, 2012, issued in Canadian Patent Application No. 2,565,402.

State Intellectual Property Office of People's Republic of China, First Office Action dated May 8, 2009, in Chinese Patent Application No. 200610142824.8, together with an English translation thereof.

State Intellectual Property Office of People's Republic of China, Second Office Action dated Jul. 4, 2011, in Chinese Patent Application No. 200610142824.8, together with an English translation thereof.

State Intellectual Property Office of People's Republic of China, Third Office Action dated Dec. 31, 2011, in Chinese Patent Application No. 200610142824.8, together with an English translation thereof.

State Intellectual Property Office of People's Republic of China, Notification of Grant dated Apr. 6, 2012, issued in Chinese Patent Application No. 200610142824.8, together with an English translation thereof.

Intellectual Property Office India, Examination Report dated Apr. 7, 2011, issued in Indian Patent Application No. 2336/DEL/2008.

Anand and Anand, Response to Examination Report dated Jun. 6, 2011, filed in Indian Patent Application No. 2336/DEL/2008.

Intellectual Property Office India, Notice of Hearing dated Oct. 5, 2011, issued in Indian Patent Application No. 2336/DEL/2008.

Anand and Anand, Written Submissions dated Oct. 31, 2011, filed in Indian Patent Application No. 2336/DEL/2008.

Intellectual Property Office India, Certificate of Grant dated Mar. 6, 2012, issued in Indian Patent Application No. 2336/DEL/2008.

Norton Rose, Response to Examination Report dated Jan. 7, 2013, filed in Canadian Patent Application No. 2,565,402.

Norton Rose Fulbright, Response to Examiner's Requisition filed Nov. 14, 2013, in Canadian Patent Application No. 2,565,402.

Canadian Intellectual Property Office, Examiner's Requisition dated Aug. 9, 2013, issued in Canadian Patent Application No. 2,565,402.

\* cited by examiner

METHOD AND SYSTEM FOR PROVISIONING WIRELESS SERVICES

CROSS REFERENCE TO RELATED APPLICATIONS

This application is a continuation of U.S. application Ser. No. 11/259,270, filed Oct, 27, 2005, the entirety of which is hereby incorporated by reference.

FIELD OF THE APPLICATION

This application relates to the field of service provisioning for wireless devices, and more specifically, to dynamic provisioning of wireless devices for services offered by value-added service providers.

BACKGROUND

Current generations (e.g., "2.5G" and "3G") of wireless mobile communication devices include microprocessors, information storage capability, and run one or more software applications. Examples of software applications used in these wireless devices include micro-browsers, address books, and email clients. Additionally, these generations of wireless devices have access to a plurality of services via the Internet. A 3 G wireless device may, for example, be used to browse Web sites on the Internet, to transmit and receive graphics, and to execute streaming audio and/or video applications. The transfer of Internet content to and from wireless device is typically facilitated by the Wireless Application Protocol (WAP), which integrates the Internet and other networks with wireless network platforms.

Before a consumer can use a wireless device, a number of parameters must be provisioned into the wireless device in order to enable communication services and applications and in order to distinguish the wireless device from others within the communications network. Provisioning may typically include programming the wireless device with a telephone number and programming the wireless network with the serial number and telephone number of the wireless device. Thus programmed, the wireless device and wireless network are enabled to carry calls between the wireless device and the public switched telephone network (PSTN). Provisioning may also include programming the wireless network and wireless device to support one or more optional features for the wireless device, such as call forwarding, three-way calling, voice messaging, short messaging, email forwarding, and paging.

Traditionally, provisioning of a wireless device has been performed on the premises of the vendor or distributor of the wireless device. A data port on the wireless device is used to connect the device to a programming system that uploads provisioning data into the wireless device, such as the telephone number assigned to the wireless device, in order to program it for use on the wireless network. Alternatively, the wireless device is programmed through its key pad. This approach requires the often undesirable step of provisioning the wireless device before it can be delivered to a subscriber.

The ability to deliver a wireless device directly to a subscriber without first having to provision the wireless device provides improved speed of delivery to the subscriber and a simplified provisioning process. As such, wireless service providers can sell their wireless devices directly to potential subscribers through, for example, display booths in supermarkets and department stores.

To facilitate such direct sales to potential subscribers, and to make wireless services as convenient and as affordable as possible, over-the-air (OTA) service provisioning was introduced. In OTA provisioning, simple instructions are provided to guide the buyer through the process of activating the wireless device and signing up for wireless services to become a subscriber. For example, the buyer can activate a new wireless device and sign up for service by dialing a predetermined number (e.g., "*228xx") in accordance with the wireless device's instructions. Dialing the predetermined number on the wireless device keypad automatically initiates a special purpose call that connects the buyer to an operator. The operator requests certain account information from the buyer, such as personal information, a credit card number, and a home billing address. When the account information is collected and the account is set up, the operator instructs the buyer to enter a sequence of passwords, code numbers, menu-selected commands, etc., that enable certain functions in the wireless device.

To automate service provisioning even further, service provisioning solutions now allow at least part of the OTA service provisioning process to be performed by accessing a provisioning server from an unprovisioned wireless device via an Internet connection. Using an Internet connection allows a wireless service provider to consolidate service provisioning applications and data in a central repository.

In addition to provisioning the wireless device, it is also necessary to provision elements in the wireless communications network which are responsible for effecting mobile communications services and applications (e.g., billing plan, voice mail, call forwarding, email, information services, etc.). These elements include servers and other network devices maintained by wireless carriers, service providers (SPs), value-added resellers (VARs), and mobile virtual network operators (MVNOs).

A wireless carrier or wireless network operator typically owns and operates a wireless network including radio equipment, base stations, antennae, interface equipment, servers, associated landlines, etc. A carrier also manages basic billing and other back-end services needed to sell wireless services to subscribers. The carrier may sell wireless services directly to subscribers in which case the carrier is also an SP. The carrier may also partner with a VAR, a form of SP who sells the carrier's services and may also provide certain additional services. In addition, the carrier may sell otherwise unused network capacity to one or more MVNOs. A MVNO is an SP that does not maintain its own wireless network (i.e., radio equipment). MVNOs may include large retailers, cable operators, and consumer goods companies with important brands. Unlike SPs and VARs, MVNOs offer their own unique content or marketing cachet to subscribers and often serve specific target markets or interests. MVNOs enable carriers to attract new market segments and thereby load their networks more fully. Carriers can devolve marketing, sales, billing, customer relations, and related front and back office functions to MVNOs who may provide these functions more efficiently for their target markets than can the carriers themselves. Thus, SPs, VARs, and MVNOs have similar and often overlapping roles.

One shortcoming of present provisioning systems is their inability to effectively deal with service assignment conflicts between wireless devices and supporting wireless network elements such as SPs' customer service systems. A service assignment conflict exists when services assigned to a wireless device differ from services assigned to the subscriber associated with the wireless device in an SP's customer service system. The need to effectively handle service assignment conflicts is increasing in importance with the increase in the number of SPs, VARs, and MVNOs on wireless networks. Other shortcomings with present provisioning systems are their inabilities to effectively support service provisioning on disparate networks, control service access without requiring additional development or processes, restrict access to services at the individual subscriber or handheld level, control service access to a group of subscribers or handhelds without requiring different hardware, and prevent fraudulent use of unauthorized services.

A need therefore exists for an improved method and system of provisioning wireless devices and services. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The following detailed description of the embodiments of the present application does not limit their implementation to any particular computer programming language. The embodiments may be implemented in any computer programming language provided that the operating system (OS) provides the facilities that may support the requirements of the present application. A preferred embodiment is implemented in the Java™ computer programming language (or other computer programming languages such as C or C++). (Java and all Java-based trademarks are the trademarks of Sun Microsystems Corporation.) Any limitations presented would be a result of a particular type of operating system or computer programming language and would not be a limitation of the present application.

According to one aspect of the application, there is provided a method for provisioning wireless devices for use of services offered by a service provider on a wireless network, comprising: receiving at a provisioning system from a wireless device a wireless device identifier, the wireless device having a first subset of the services; identifying from the wireless device identifier a subscriber associated with the wireless device, the subscriber having a second subset of the services; and, if the first and second subsets conflict, enabling none, one, or both of the first and second subsets of services in accordance with conflict resolution information for the service provider.

Preferably, the method further comprises, before enabling none, one, or both of the first and second subsets of services, comparing the first and second subsets for conflict.

Preferably, the method further includes transmitting to the service provider an error message if the first and second subsets conflict.

Preferably, the wireless device identifier is stored in a memory device of the wireless device.

Preferably, the memory device is a subscriber identity module (SIM).

Preferably, the services include electronic mail services.

Preferably, the provisioning system is operated by a second service provider such as a value-added service provider (VASP).

In accordance with further aspects of the present application there is provided an apparatus such as a provisioning system, a method for adapting this system, as well as articles of manufacture such as a computer readable medium having program instructions recorded thereon for practicing the method of the application.

Figure 1:
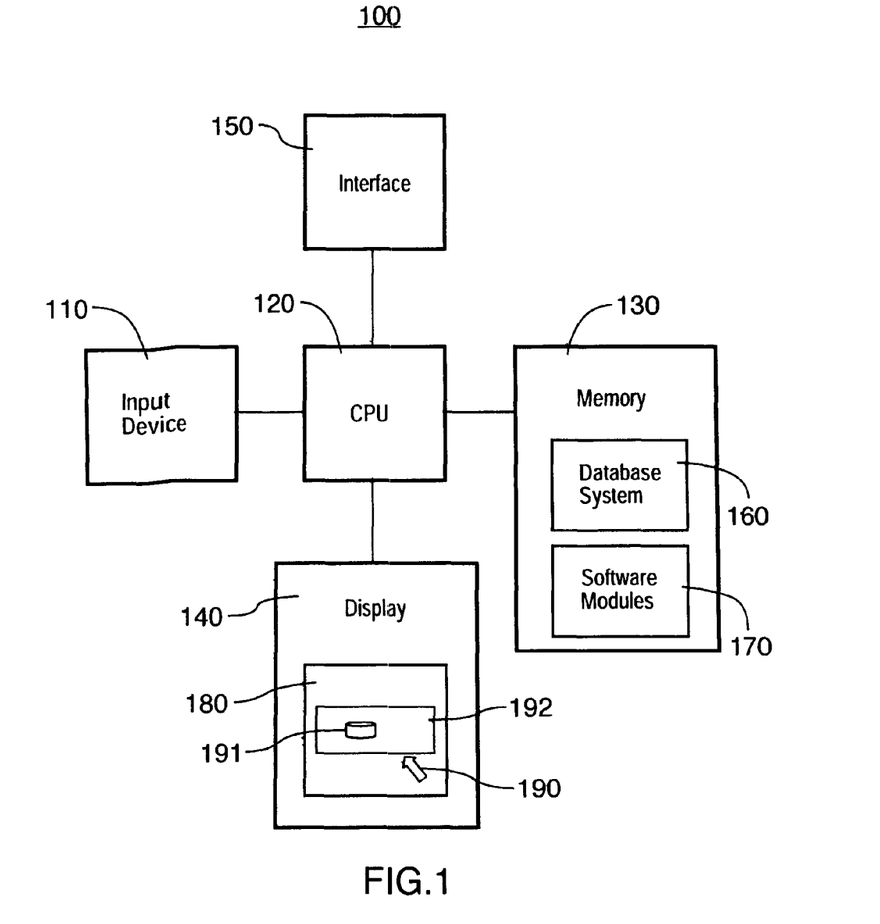
FIG. 1 is a block diagram illustrating an exemplary provisioning system adapted for implementing an embodiment of the application.

FIG. 1 is a block diagram illustrating an exemplary provisional system 100 adapted for implementing an embodiment of the application. The provisioning system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection. The provisioning system 100 is adapted for provisioning wireless devices 210 in a wireless network environment 200 (see FIG. 2).

The provisioning system 100 may be a server system or a personal computer (PC) system. The CPU 120 of the data provisioning system 100 is operatively coupled to memory 130 which stores an operating system (not shown), such as IBM Corporation's OS/2™, UNIX, etc., for general management of the system 100. The interface 150 may be used for communicating to external data processing systems through a network (see FIG. 2), such as the Internet. Examples of suitable platforms for the provisioning system 100 include iSeries™ servers and ThinkCentre™ personal computers available from IBM Corporation. The provisioning system 100 may include application server software (not shown), such as WebLogic® Server available from BEA Systems, Inc., for developing and managing distributed applications.

The provisioning system 100 may include a database system 160 for storing and accessing programming information. The database system 160 may include a database management system (DBMS) and a database and is stored in the memory 130 of the provisioning system 100. It will be appreciated that the database system 160 may be shipped or installed without the database to or by end users. In general, the DBMS is adapted to read a query generated by the provisioning system 100 in response to a request for information submitted by a user typically through a user interface. The DBMS then executes the query against the database and provides a query result to the provisioning system 100 for presentation to the user. It will be appreciated that the database system 160 may be stored in the memory 130 of the provisioning system 100 or stored in a distributed provisioning system (see FIG. 2).

Examples of suitable DBMSs include the Oracle® and DB2™ Universal Database Management System products available from Oracle Corporation and IBM Corporation, respectively. The DBMS is a software layer interposed between the actual database (i.e. the data as stored for use by the CPU 120 of the system 100) and the users of the system. The DBMS is responsible for handling database transactions thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The standard database query language for dealing with relational databases implemented by most commercial DBMSs is the Structured Query Language (SQL).

The provisioning system 100 includes computer executable programmed instructions for directing the system 100 to implement the embodiments of the present application. The programmed instructions may be embodied in one or more software modules 170 resident in the memory 130 of the provisioning system 100. Alternatively, the programmed instructions may be embodied on a computer readable medium (such as a CD disk or floppy disk) which may be used for transporting the programmed instructions to the memory 130 of the provisioning system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the provisioning system 100 from the network by end users or potential buyers.

The CPU 120 of the system 100 is typically coupled to one or more devices 110 for receiving user commands or queries and for displaying the results of these commands or queries to the user on a display 140. For example, user queries may be transformed into a combination of SQL commands for producing one or more tables of output data which may be incorporated in one or more display pages for presentation to the user. The CPU 120 is coupled to memory 130 for containing programs 170 and data such as base tables or virtual tables such as views or derived tables. As mentioned, the memory 130 may include a variety of storage devices including internal memory and external mass storage typically arranged in a hierarchy of storage as understood to those skilled in the art.

A user may interact with the provisioning system 100 and its software modules 170 using a graphical user interface (GUI) 180. The GUI 180 may be Web-based and may be used for monitoring, managing, and accessing the provisioning system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI-based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
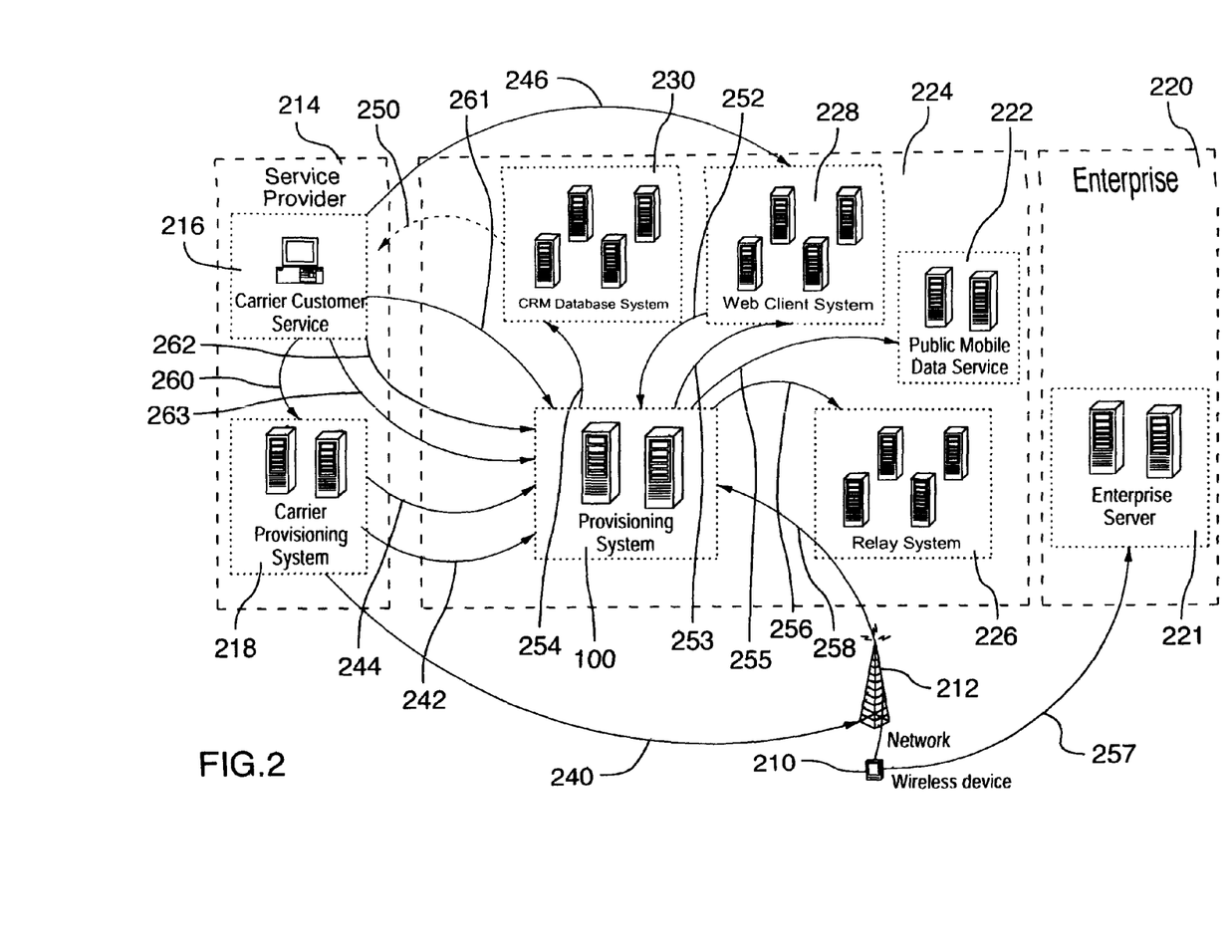
FIG. 2 is a block diagram illustrating a wireless network environment including the provisioning system in accordance with an embodiment of the application.

FIG. 2 is a block diagram illustrating a wireless network environment 200 including the provisioning system 100 in accordance with an embodiment of the application. In FIG. 2, the provisioning system 100 is located within a distributed provisioning system 224 which includes a relay system 226, a Web client system 228, a customer relationship management (CRM) database system 230, and a public mobile data service (PMDS) system 222. Of course, the functionality of the relay system 226, Web client system 228, CRM database system 230, and PMDS system 222 may be included within the provisioning system 100.

The CRM database system 230 includes servers for storing and accessing subscriber billing, service provider, and related information. The CRM database system 230 may include CRM applications and enterprise resource planning (ERP) applications available from SAP® AG. The CRM database system 230 generates invoice messages 250 for service providers 214 (i.e., carriers, VARs, MVNOs, and other SPs). The provisioning system 100 is coupled to the CRM database system 230 and passes updated and newly created service contract messages 254 to the CRM database system 230.

The Web client system 228 includes servers for providing an Internet-based email interface for wireless device subscribers. Through the Web client 228, email is directed to wireless devices or handhelds 210 over the wireless network 212. The Web client 228 allows subscribers to add email account services for operation through their wireless devices 210. Email is redirected wirelessly to subscribers' wireless devices 210 so that subscribers can send, receive, forward, and reply to messages wirelessly. In addition, the Web client system 228 allows subscribers to access their email account over the Internet with a landline-based PC. Each SP 214 may have its own Web client system 228 site (i.e., a "Web client site") for its subscribers. Services provided by the Web client site are configurable based on the SP 214. Advantageously, not only can carriers access a Web client 228 site to manage subscriber setting 246, but so can VARs, MVNOs, and other SPs. The Web client system 228 is coupled to the provisioning system 100 for exchanging enable/block service access messages 252, 253.

The relay system 226 includes servers for transferring information between the provisioning system 100 and wireless devices 210 over the wireless network 212. As discussed above, the wireless network 212 is generally owned and operated by a carrier 214. It is through the relay system 226 that the provisioning system 100 is coupled to the wireless network 212. The relay system 226 handles a variety of low level operations for subscribers 210. The relay system 226 receives registration messages 258 from wireless devices 210 and passes these messages to the provisioning system 100. In return, the provisioning system 100 passes enable/block service access messages 256 to the relay system 226.

Each SP 214 has a carrier customer service system 216 which is coupled to a carrier provisioning system 218. The carrier customer service system 216 may be similar in component configuration to the provisioning system 100 (see FIG. 1). The carrier customer service system 216 provides the carrier provisioning system 218 with activate subscriber messages 260. In turn, the carrier provisioning system 218 provides activate network service messages 240 to the wireless network 212 for transmission to the distributed provisioning system 224 and/or wireless devices 210. In addition, and as mentioned above, the carrier customer service system 216 of the SP 214 receives invoice messages 250 from the CRM database system 230. Furthermore, the carrier customer service system 216 provides manage-service configuration 261, subscriber service provisioning 262, and handset service assignment 263 messages to the provisioning system 100. Moreover, the carrier provisioning system 218 provides subscriber service assignment 244 and handset service assignment 242 messages to the provisioning system 100. Lastly, the carrier customer service system 216 provides update Web client site subscriber settings messages 246 to the Web client system 228. Note that additional options beyond activation and service assignment are available to carriers including, for example, suspend, resume, deactivate, modify services, modify subscriber data, etc.

The PMDS system 222 includes servers for providing data services for wireless device subscribers. Through the PMDS system 228, data is directed to wireless devices 210 over the wireless network 212. The provisioning system 100 provides the PMDS system 222 with enable/block service access messages 255.

In operation, using their customer service systems 216, SP users can log in via a Web-based user interface to the distributed provisioning system 224 to manage provisioning aspects of their respective subscribers. Thus, the distributed provisioning system 224 acts as an intermediary between SPs 214 and wireless device 210 subscribers, providing email forwarding, related billing, provisioning, and other services. In effect, the distributed provisioning system 100 is a form of SP providing specialized support and services for wireless devices such wireless handhelds. An SP may provide provisioning and related services through a branded service. Such SPs are sometimes referred to as value-added service providers (VASPs). Of course, the service may be re-branded and offered by other SPs to their subscribers.

In addition, enterprises 220 may have their own enterprise server system 221 for providing wireless device 210 based email services to their employee subscribers. The enterprise server system 221 is managed by the enterprise 220. It is coupled to the relay system 226 and though the relay system 226 to the wireless network 212. The enterprise server system 221 receives synchronization messages 257 from the relay system 226.

Enterprises 220 may also have a dedicated "prosumer" server system (not shown) integrated with the distributed provisioning system 224 for providing wireless device 210 based email services to their employee subscribers. A prosumer (also referred to as professional consumer) server system is system having specifications which fall between those of professional systems at a higher end and consumer system at a lower end. In this case, the prosumer server system is managed by the VASP. It is coupled to the relay system 226 and though the relay system 226 to the wireless network 212. The prosumer server system receives synchronization messages (not shown) from the relay system 226.

One aspect of the present application extends the ability of SPs 214 to control access and services and to dynamically resolve service assignment conflicts. In general, the provisioning system 100, 224 of the present application provides a method of controlling access to various services offered by VASPs. The provisioning system 100, 224 is used by SPs 214 to activate/manage/deactivate subscriber services. Service subscribers use the provisioning system 100, 224 for activating and managing services that they have subscribed to. The provisioning system 100, 224 provides the VASP with administrative capabilities for managing these service subscribers. The provisioning system 100, 224 also provides subscriber activation records to the CRM database system 230 for billing purposes, etc. Furthermore, the provisioning system 100, 224 provides external interfaces such as HTML, XML, and WML for SPs 214 and subscribers to use. Thus, the present application provides SPs 214 with an increased level of control and management of wireless device 210 subscribers.

The expressions defined below will be used in the description to follow:

1. "Default XML/Web Subscriber Services": If no service is specified through the Web or XML interface 216 when a transaction is submitted, a default service is implicit in every request. This setting is managed as an element of the SP's service configuration 261.
2. "Default Registration Subscriber Services": If no services are enabled for a particular subscriber when registration 258 occurs, the default registration service (or services) are assigned. This setting is managed as an element of the SP's service configuration 261.
3. "Default Handset Services": If no services are assigned for a particular handheld 210 when registration 258 occurs, the default handset service (or services) are assigned. This setting is managed as an element of the SP's service configuration 261. Default handset services may be based on device type, manufacturer, software revision, etc.
4. "Service Reconciliation" occurs when services have been activated for a subscriber and assigned to a handheld 210 prior to the subscriber/handset registering 258. Service reconciliation may reveal a service conflict or may require additional actions to ensure service access is updated appropriately.
5. "Service Conflict": Service conflicts occur when conflicting service settings are detected for a subscriber and a handset 210. Service conflicts are resolved by applying the SP's service conflict resolution policy information.
6. "Service Conflict Resolution Policy": SPs have the ability to decide whether a service conflict results in the handheld 210 or subscriber service assignment taking priority. This setting is managed as an element of the SP's service configuration 261.
7. "Handheld Service Type Assignment": SPs can determine the default service type for their handhelds 210. By assigning a service type to a handheld 210, the SP is able to determine the provisioning experience the user will have on their handheld 210 when first turned on. SPs have the ability to change the service type assignment for any handheld 210 at any time.
8. "Service Access Control": Service access control provides SPs with the ability to manage and control the services their subscribers have access to. By using service access control, subscribers can be limited to a particular service, regardless of the wireless handheld 210 they are using.
9. "Enterprise service": Enterprise service subscribers (i.e., enterprises 220 having an enterprise server system 221 and their subscribers) have their wireless email service enabled through their enterprise's information technology (IT) department. In other words, enterprise service does not use a handheld-based provisioning model. Handhelds 210 that are assigned to the enterprise service type are not provided with any handheld-based provisioning methods upon activation;

10. "Prosumer service": Prosumer service subscribers (i.e., enterprises 220 having a prosumer server system and their subscribers) have their wireless email service enabled through a handheld-based provisioning model, providing an easy to use method for subscribers to set-up their email service. Handhelds 210 that are assigned to the prosumer service type are provided with the handheld-based provisioning methods as configured by the SP at the time of handheld activation.

Figure 3:
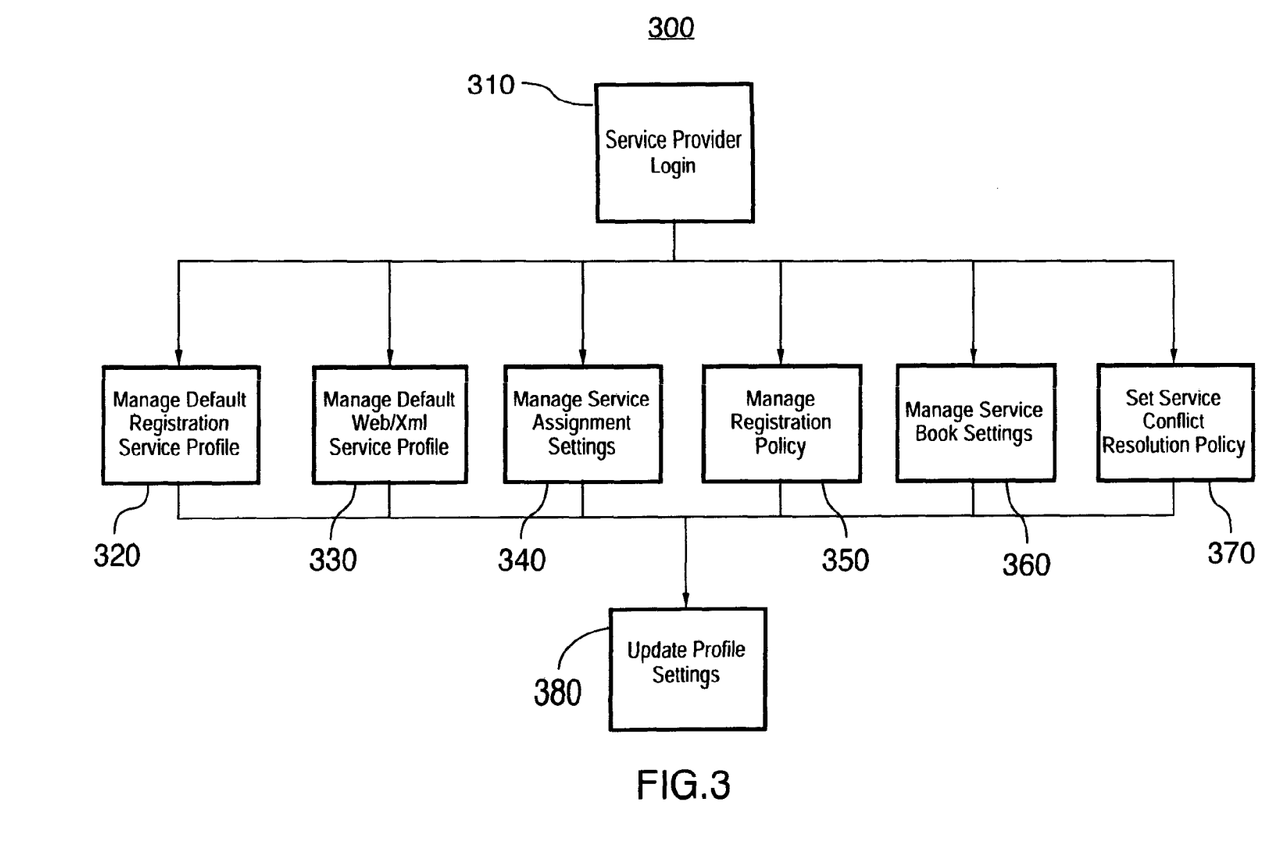
FIG. 3 is a flowchart illustrating general operations of modules within a provisioning system for managing subscriber services in accordance with an embodiment of the application.

FIG. 3 is a flowchart illustrating general operations 300 of modules 170 within a provisioning system 100, 224 for managing subscriber services in accordance with an embodiment of the application. Handheld service type assignment and service access control are both managed through the provisioning system 100, 224. SPs 214 can use either the HTML or XML interface to manage their subscribers and their handhelds 210.

SPs 214 manage their profile and default settings through their customer service systems 216 which include Web interfaces to the provisioning system 100, 224. Interfaces are provided to allow for the management of service setting profiles and for the configuration of service conflict override rules. Override rules are used to automatically resolve service conflicts between subscribers and handhelds 210 when a manual override is not specified. Override rules can be specified at the subscriber or handheld level or at the individual service level.

At step 310, the operations 300 start. Users such as SP managers and administrators have access to their profiles through the provisioning system's Web interface 216.

At steps 320, 330, 340, 350, 360, 370, users can manage default registration service profiles, manage default Web/XML service profiles, manage service management settings, manage registration policies, manage service book settings, and set service conflict resolution policies, respectively.

At step 380, the operations 300 end with the completion of service management processing.

Other aspects of the present application provide several improvements in wireless device service provisioning as follows. The present application provides a generic provisioning system 100, 224 that supports service provisioning and access control on disparate networks including CDMA (Code-Division Multiple Access), GPRS (General Packet Radio Service), Mobitex, and Motorola's iDEN (Integrated Digital Enhanced Network) and DataTAC™ networks. The present application provides SPs 214 with means to control service access without requiring additional development or processes. The present application provides SPs 214 with means to restrict access to services at the individual subscriber or handheld level. The present application provides SPs 214 with means to control service access to a group of subscribers or handhelds without requiring different hardware. This addresses the "two SKU problem", that is, the problems created when an SP must maintain more that one stockkeeping unit (SKU) for a handheld 210. Finally, the present application helps prevent fraudulent use of unauthorized services without introducing any additional development or processes on the part of SPs.

In more detail, the provisioning system 100, 224 provides generic interfaces 216 to SPs 214 that are independent of any specific network technology. These interfaces include a standards-based business-to-business (B2B) interface (e.g., Web-Service with SOAP, XML, etc.) as well as a Web interface to manage their subscribers, handhelds, and account profiles. Each SP 214 is able to define unique identifiers for their subscribers and handhelds 210 based on the parameters inherent in their technology. For example, if an SP is GPRS-based, then it may use network-specific identifiers such as IMSI (International Mobile Subscriber Identity), ICCID (Integrated Circuit Card Identifier), MSISDN (Mobile Station Integrated Services Digital Network), and/or IMEI (International Mobile Equipment Identity). These network-specific identifiers are then mapped to a service-specific identifier (i.e., a PIN or personal identification number) for universal access control at a centralized point (i.e., the relay system 226) in the provisioning system 100, 224. Management of the generic interfaces, the carrier profile configuration, and the mapping between network-specific identifiers and a generic service-specific identifier is handled by the provisioning system 100, 224.

The relay system 226 uses named parameters to pass a registration message 258 to the provisioning system 100, 224 through the provisioning system's registration interface (not shown). This information may be passed by an HTTP post. For Mobitex and DataTAC registrations, the relay system 226 may pass the following parameters (strings) to the provisioning system 100, 224: Relay ID (a string in decimal format); PIN; ESN (Electronic Serial Number); and, Invalid PIN (a string which can be "0" or "1", with "1" indicating that the PIN is blocked in the relay system 226). For a GPRS registration, as mentioned above, the relay system 226 may pass the following parameters (strings) to the provisioning system 100, 224: Relay ID; PIN; IMEI; IMSI; ICCID; MSISDN MDN (a string representing the phone number); and, Invalid PIN. For a CDMA registration, the relay system 226 may pass the following parameters (strings) to the provisioning system 100, 224: Relay ID; PIN; ESN; IMSI; MSISDN MDN; and, Invalid PIN. And, for an iDEN registration, the relay system 226 may pass the following parameters (strings) to the provisioning system 100, 224: Relay ID (a string in decimal format); PIN; IMEI; MSISDN MDN (a string representing the phone number); SIM ID (Subscriber Identity Module ID); and, Invalid PIN.

The relay system 226 is able to determine the network type for each registration packet. It provides an interface to the provisioning system 100, 224 to block registration flow on a per network or carrier basis. The registration interface of the provisioning system 100, 224 is able to determine the SP for every valid registration and is able to discard a registration on a per SP basis.

Now, many SPs 214 are not able to take on additional development to launch a particular service. At the same time these SPs 214 demand that service access be controlled by a centralized system. The provisioning system 100, 224 supports the creation of "carrier service profiles" so that SPs can define the services they want their subscribers and handhelds to be granted by default when the subscriber/handheld 210 registers with the provisioning system 100, 224. SPs can set-up exactly what services they would like each class of handheld to be granted or whether a class of handhelds is not to be granted any access. This is enforced by the provisioning system 100, 224 as soon as registration takes place. The class of handheld may be based on device type, manufacturer, software revision, etc.

In addition, the provisioning system 100, 224 provides several real-time interfaces for SPs to manage service access control for their subscribers or handhelds. SPs 214 have the ability to identify individual subscribers and to activate specific services for these subscribers as part of their own provisioning process. Access control and billing of services are tied together to ensure accurate accounting for all services. A database table 160 maintains mappings of service "CLASS- MASKs" that are used to identify certain classes of service in an efficient manner as each packet of data flows through the provisioning system 100, 224. A bit-wise comparison can be performed to quickly determine if access to a specific service has been granted.

Furthermore, SPs 214 may find it inconvenient to maintain a separate inventory of hardware for different service offering (e.g., Web client service, enterprise service, prosumer service, etc.). Previously, separate "branded" wireless devices were distributed to subscribers for these services, requiring two different SKUs. To move inventory from one SKU to another often required returning stock. This was a tedious process. However, the provisioning system 100, 224 of the present application provides a service assignment interface to allow SPs 214 to upload batch files to enable a subset of handhelds 210 for a specific service. The services assigned to a handheld 210 can be changed by simply updating the service assignment in a subsequent upload. The provisioning system 100, 224 maintains a database 160 of default service assignments for all handhelds and applies the appropriate service CLASSMASK to data flowing through the provisioning system 100, 224 and relating to the handheld as soon as a recognized handheld registers. Furthermore, the provisioning system 100, 224 provides SPs 214 with the ability to choose between handheld service assignment and subscriber service activation in the case where a conflict occurs between settings.

Moreover, SPs 214 typically subsidize handheld sales depending on the services being enabled for the various handhelds 210. For example, a handheld sold with enterprise service may be priced at $400 whereas a handheld sold with prosumer service may be priced at $200. The SP 214 needs some way to ensure that the lower priced prosumer service handheld is not able to use the higher priced enterprise service. The provisioning system 100, 224 provides a means to identify the handheld type (based on pre-activation or service assignment) and ensure that only certain services are accessible by that handheld by setting and communicating a CLASSMASK to elements of the provisioning system 100, 224. Once the CLASSMASK has been set, fraudulent use of unauthorized services becomes impossible. The provisioning system 100, 224 provides interfaces 216 for allowing an SP 214 to change the service profile for a particular subscriber or handheld 210 to allow access to a desired service (perhaps after a premium is paid).

Figure 4:
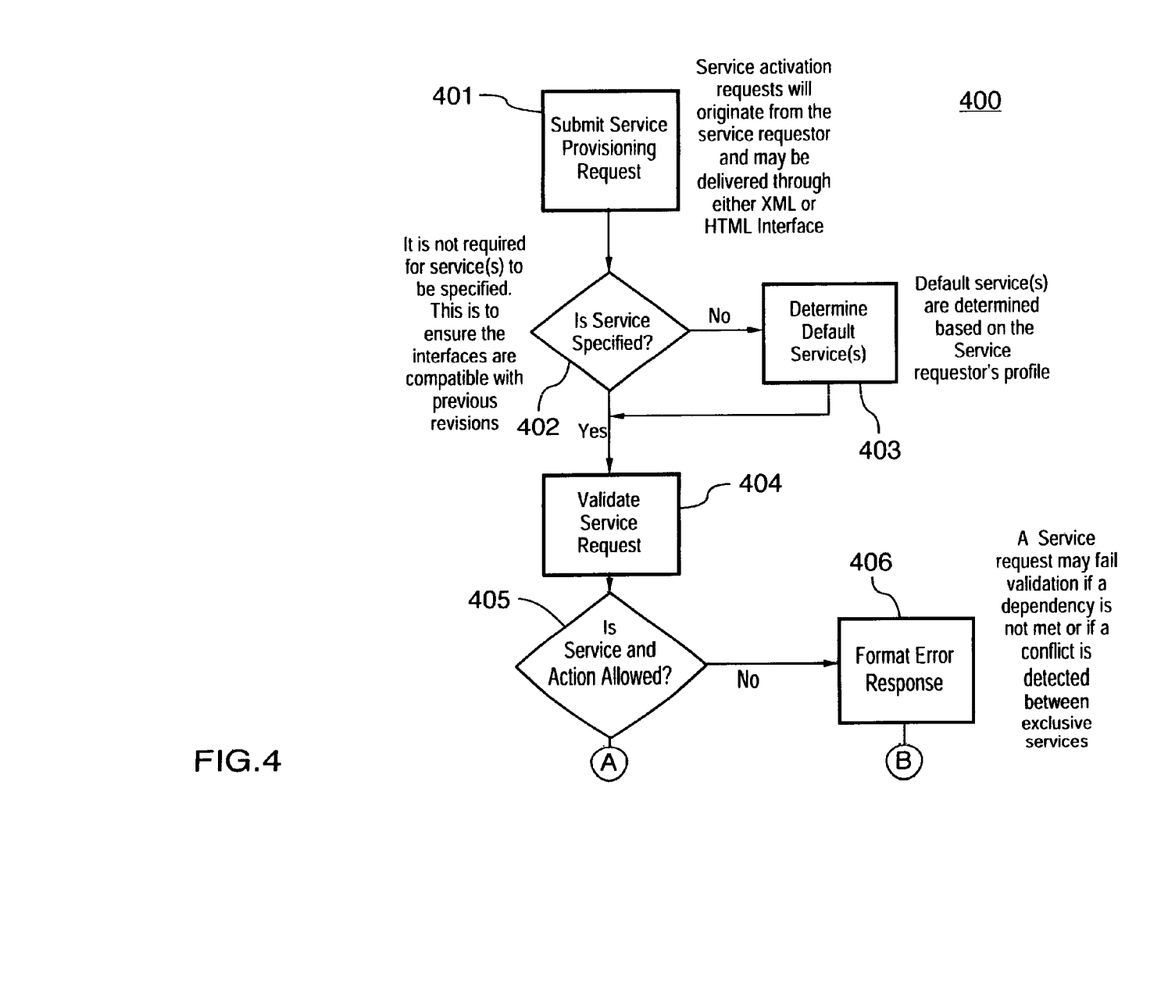
FIG. 4 is a flowchart illustrating operations of modules within a provisioning system for subscriber service provisioning in accordance with an embodiment of the application.

FIG. 4 is a flowchart illustrating operations 400 of modules 170 within a provisioning system 100, 224 for subscriber service provisioning in accordance with an embodiment of the application. Subscriber service provisioning encapsulates the process of activating and managing subscriber access to services. It controls which services are available to subscribers.

At step 401, the operations 400 start. A service provisioning request 262, 244 is submitted to the provisioning system 100, 224 by a service provider 214. Note that service activation requests originate from a service requestor and may be delivered through either an XML or HTML interface 216.

At step 402, a determination is made as to whether a service is specified. It is not required that services be specified. This step is to ensure that the interfaces are compatible with earlier versions of service provisioning software.

At step 403, if a service is not specified, then a default service is determined. Default services are determined based on the SP's profile 261.

At step 404, if a service is specified then the service request is validated.

At step 405, a determination is made as to whether the service and action are allowed.

At step 406, if the service and action are not allowed, then an error response is formatted. A service request may fail validation if a dependency is not met or if a conflict is detected between exclusive services. Operations then proceed to final step 414 discussed below.

At step 407, if the service and action are allowed, then a determination is made as to whether service reconciliation is required. Service reconciliation may be required if the subscriber is associated with a handheld 210 that has triggered default services on registration.

At step 408, if service reconciliation is required, then service reconciliation is performed. Service reconciliation may require deactivation or modification of existing services. Operations then proceed to step 409.

At step 409, continuing from step 407, if service reconciliation is not required, then a determination is made as to whether services require access control.

At step 410, if services do require access control, the service access control information is updated. How access control is enforced depends on the service. For example, the relay system 226 is the primary point of control for Web client, enterprise, and browsing related services. Operations then proceed to step 411.

At step 411, if services do not require access control, then the service status is updated.

At step 412, service invoicing information is updated.

At step 413, a success response is formatted.

At step 414, operations 400 end with the return of either a success response or an error response.

Figure 5:
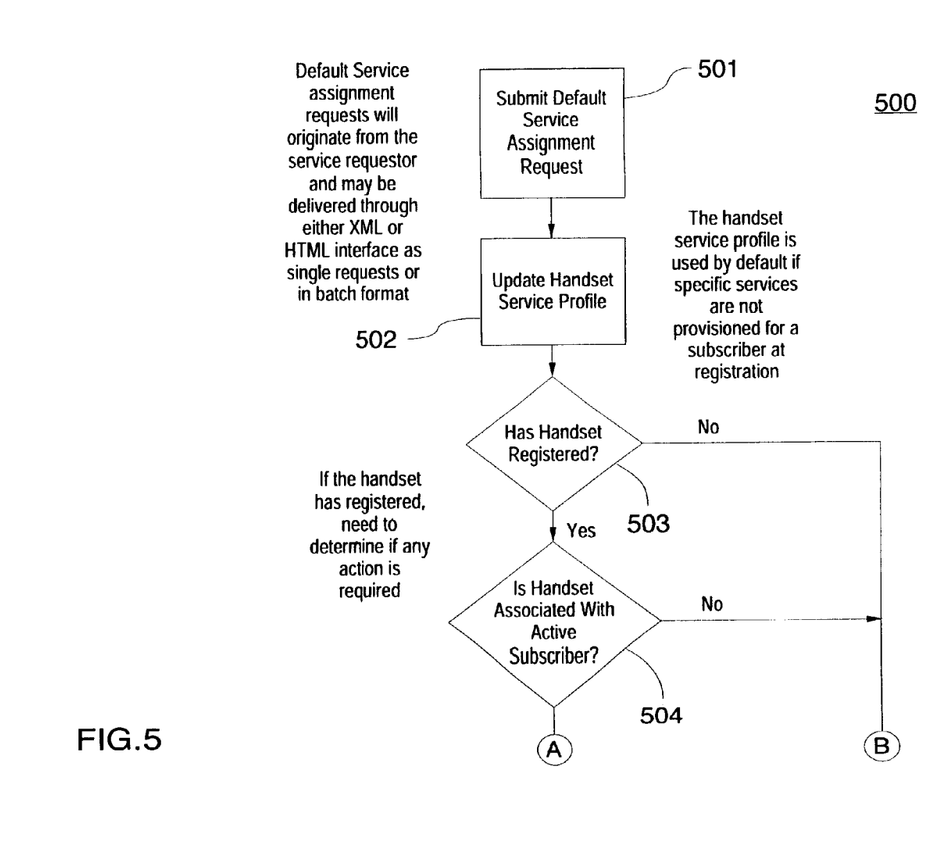
FIG. 5 is a flowchart illustrating operations of modules within a provisioning system for handheld service assignment in accordance with an embodiment of the application; and, FIG. 6 is a flowchart illustrating operations of modules within a provisioning system for reconciling subscriber services in accordance with an embodiment of the application.

FIG. 5 is a flowchart illustrating operations 500 of modules 170 within a provisioning system 100, 224 for handheld service assignment in accordance with an embodiment of the application.

At step 501, the operations 500 start. A default service assignment request 263, 242 is submitted to the provisioning system 100, 224 by an SP 214. Default service assignment requests originate from an SP and may be delivered through either an XML or HTML interface as single requests or in batch format.

At step 502, the service profile for the handheld 210 is updated. The handheld service profile is used by default if specific services are not provisioned for a subscriber at registration.

At step 503, a determination is made as to whether the handheld 210 has been registered. If the handheld 210 has been registered, it must be determined if any action is required.

At step 507, if the handheld 210 has not been registered, then a success response if formatted. Operations then proceed to step 508.

At step 504, if the handheld 210 has been registered, then a determination is made as to whether the handheld 210 is associated with an active subscriber. If the handheld 210 is not associated with an active subscriber, then operations proceed to step 507.

At step 505, if the handheld 210 is associated with an active subscriber, then a determination is made as to whether the active service conflicts with the service allocation. If the active service does not conflict with the service allocation, then operations proceed to step 507.

At step 506, if the active service does conflict with the service allocation, then a warning response is formatted. Thus, even if the handheld 210 has registered and is associated with a conflicting service, the service profile is updated for future registrations. A warning is returned in this case. Operations then proceed to step 508.

At step 508, operations 500 end with the return of either a success response or a warning response.

Figure 6:
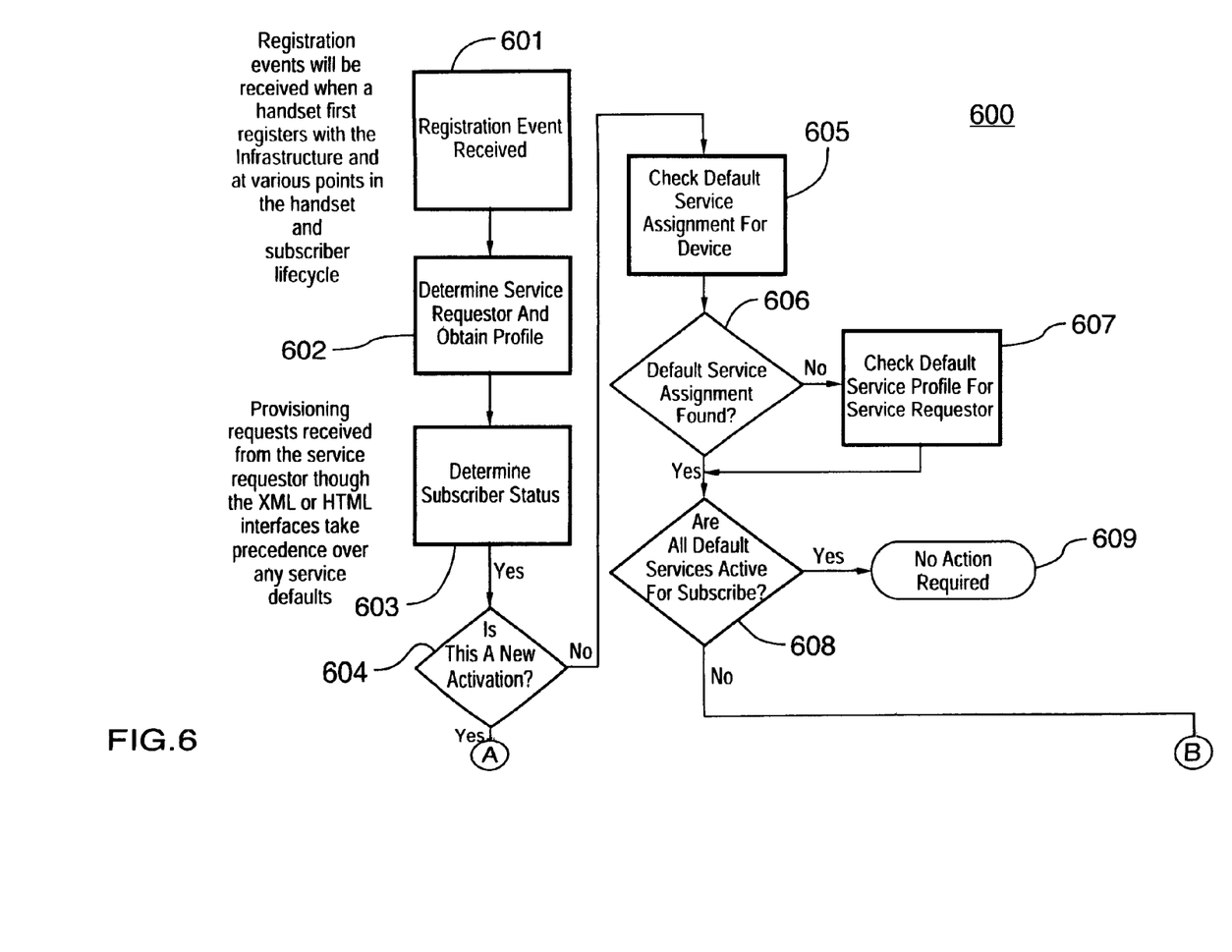

FIG. 6 is a flowchart illustrating operations 600 of modules 170 within a provisioning system 100, 224 for reconciling subscriber services in accordance with an embodiment of the application. During registration, subscriber information (see FIG. 4), provided by the SP 214 via the XML or Web provisioning interface 216, is reconciled against handheld information (see FIG. 5) by the provisioning system 100, 224. A handheld 210 may be assigned services or associated with an account maintained on the Web client system 228. Also, for certain SPs 214, registration may trigger the activation or deactivation of services depending on the SP's registration policy and default service profile. If a service conflict exists between the handheld and the subscriber, the SP's override rules dictate behaviour.

At step 601, the operations 600 start. A registration event or message 258 is received by the provisioning system 100, 224. The registration event is received when a handheld first registers with the provisioning system 100, 224 and at various points in the handheld and subscriber lifecycle.

At step 602, the service requestor (i.e., SP) is identified and the corresponding profile is retrieved.

At step 603, the status of the subscriber is determined. Note that provisioning requests received through the XML or HTML interface take precedence over any service defaults.

At step 604, a determination is made as to whether the event is a new activation.

At step 605, if the event is not a new activation, then the default service assignment for the handheld 210 is checked. Operations then proceed to step 606.

At step 606, a determination is made as to whether the default service assignment is available.

At step 607, if the default service assignment is not available, then the default service profile for the service requestor is checked. Operations then proceed to step 608.

At step 608, if the default service assignment is available, then a determination is made as to whether all default services are active for the subscriber. If all default services are not active for the subscriber, then operations proceed to step 616 described below.

At step 609, if all default services are active for the subscriber, then no action is required and operations 600 end.

At step 610, continuing from step 604, if the event is a new registration, the service requestor registration policy is checked.

At step 611, if the service requestor registration policy is "notify", then the service requestor is notified (e.g., by email). Notification may delay the processing of the registration event typically for 24 hours after which the subscriber will either be activated or deactivated depending on the service requestor's policy settings. Operations 600 then end.

At step 620, if the service requestor registration policy is "deactivate", then the service is deactivated. Operations then proceed to step 621.

At step 612, if the service requestor registration policy is "activate", then a determination is made as to whether the handheld is branded. If the handheld is not branded, then operations proceed to step 614 where the default service assignment for the handheld is checked. If the handheld is branded, then operations proceed to step 613 where the default service profile for branding is checked. At step 615, continuing from step 613, a determination is made as to whether the default branding service is found. If the default branding service is found, then operations proceed to step 616. If the default branding service is not found, then operations proceed to step 614.

At step 618, continuing from step 614, a determination is made as to whether the default service assignment is available. If the default service assignment is available, then operations proceed to step 616.

At step 619, if the default service assignment is not available, then the default service profile for the service requestor is checked. Operations then proceed to step 616.

At step 616, continuing from steps 608, 618, 619, or 615, a determination is made as to whether service reconciliation is required. If service reconciliation is not required, operations then proceed to step 621.

At step 617, if service reconciliation is required, then service reconciliation is performed.

At step 621, continuing from steps 620, 617, or 616, access control information is updated.

At step 622, service status information is updated.

At step 623, operations 600 end with updating of service invoicing information.

As mentioned above, available services include the enterprise and prosumer services. OTA activation is an option for enterprise subscribers as well as prosumer subscribers. However, different provisioning mechanisms may be provided for both types of subscribers which can be controlled by the services provisioned for an individual subscriber or handset.

Service assignment and service access control can be set for either of these services or both, meaning a handheld 210 or subscriber can be assigned access to enterprise-only, prosumer-only, or both. As such, service types include the following: enterprise-only; prosumer-only; and, enterprise and prosumer.

SPs 214 have the ability to assign a service type to their handhelds 210. This assignment will determine which handheld-based provisioning model will be exposed to the subscriber. It is important to note that service type assignment is "overridden" by the service access control set for a subscriber when present. This means that a handheld that was assigned to the enterprise service type would receive the prosumer service type experience if the subscriber were given access to the prosumer service.

The present application provides for pre-assignment of services as follows. SPs 214 select a default service type for the handhelds 210 that they sell. When a handheld 210 is first activated in the provisioning system 100, 224, the handheld 210 will be subject to the provisioning model defined by the SP 214 for that service type, unless the subscriber service access control specifies otherwise. If the SP wishes to pre-assign a different service type for a subset of handhelds, it is able to do this by providing a list of handheld identifiers (e.g., PIN, ESN/IMEI, etc.) and the service type assignment for that subset.

The present application also provides for real-time assignment of services as follows. SPs 214 are able to submit to the provisioning system 100, 224 in real-time, a modification of the handheld's default service assignment. This is typically done during the subscriber provisioning process, although it can also be done at any other time. SPs may choose to not update the service type assignment and simply use the service access control setting to dictate which provisioning experience the subscriber will have with their handheld 210, since it overrides the service type assignment when a conflict occurs.

With respect to subscriber service access control, SPs 214 are able to submit to the provisioning system 100, 224 during the subscriber provisioning process which service type a subscriber has access to. Once assigned, the subscriber will not have access to any other service type. The subscriber service type assignment can be changed at any time using the provisioning system 100, 224 (via HTML or XML).

SPs 214 can use the provisioning system 100, 224 to manage handheld service type assignment and service access control. Using either an HTML or XML interface, SPs are able to define service types for both handhelds and subscribers. In addition, the HTML interface supports the uploading of batch files for groups of handhelds or subscribers.

Now, for example, consider the case where a subscriber purchases a "prosumer-only" handheld 210 but subscribes to "enterprise-only" service. In operation, the following steps are performed:

1) The subscriber has a handheld 210 that is assigned to the prosumer service type only.

2) Upon activation by the SP 214, an activation request (via HTML or XML) specifies that this subscriber should have access to enterprise-only service.

3) If a "conflict override setting" has been enabled by the SP 214, or if the activation request specifies that if there is a conflict it should be overridden, then the provisioning system 100, 224 will automatically change the handheld service type assignment to enterprise-only.

4) If the "conflict override setting" has not been enabled as the SP default, then an error message will be returned to the SP.

Next, consider the case where a subscriber purchases a "prosumer-only" handheld and "prosumer-only" service but wishes to change to "enterprise-only" service. In operation, the following steps are performed:

1) The subscriber has a handheld 210 that is assigned to the prosumer service type only.

2) The subscriber is currently assigned to the prosumer service type only.

3) The SP 214 submits a deactivation request for prosumer-only service and submits activation request for enterprise-only service.

4) If the "conflict override setting" has been enabled as the SP default, or if the activation request specifies that if there is a conflict it should be overridden, then the provisioning system 100, 224 will automatically change the handheld service type assignment to enterprise-only.

5) If the "conflict override setting" has not been enabled as the SP default, then an error message will be returned to the SP.

Finally, consider the case where a subscriber purchases a "enterprise-only" service and places a "prosumer-only" SIM in his/her handheld 210. In operation, the following steps are performed:

1) The subscriber has a new handheld 210 that is assigned to the prosumer-only service type.

2) The subscriber is currently assigned to the enterprise-only service type.

3) The provisioning system does not allow this subscriber to have access to his/her enterprise service on this handheld 210 due to a service access control conflict. The outcome here depends on the carrier's service conflict policy. Either subscriber service or handheld service could prevail.

4) At the point of sale, the subscriber would need to specify that he/she wants to use this handheld 210 with enterprise-only service or the subscriber would need to contact the SP 214 and request to be enabled for enterprise-only service on that handheld 210.

5) The SP 214 submits a request to change handheld service assignment from prosumer-only to enterprise-only.

While this application is primarily discussed as a method, a person of ordinary skill in the art understands that the apparatus discussed above with reference to a provisioning system may be programmed to enable the practice of the method of the application. Moreover, an article of manufacture for use with a provisioning system, such as a pre-recorded storage device or other similar computer readable medium including program instructions recorded thereon may direct the provisioning system to facilitate the practice of the method of the application. It is understood that such apparatus and articles of manufacture also come within the scope of the application.

The embodiments of the application described above are intended to be examples only. Those of skill in the art may effect alterations, modifications and variations to the particular embodiments without departing from the scope of the application. The subject matter described herein in the recited claims intends to cover and embrace all suitable changes in technology.

A portion of the disclosure of this patent document contains material which is subject to copyright protection. The copyright owner has no objection to the reproduction by any one of the patent document or patent disclosure, as it appears in the Patent and Trademark Office patent file or records, but otherwise reserves all copyrights whatsoever.

What is claimed is:

1. A method, at a provisioning system, for provisioning a wireless device on a wireless network, the method comprising:

identifying, using a received wireless device identifier of the wireless device, a first default subset of unactivated communication services which have been authorized by a service provider to be available for use with the wireless device, the authorization of the first default subset of unactivated communication services being specific to the wireless device;

identifying, using the wireless device identifier, a subscriber associated with the wireless device, the service provider having pre-assigned a second subset of communication services to the subscriber, the pre-assignment of the second subset of communication services being specific to the subscriber;

reconciling any conflict between the first and second subsets of communication services in accordance with a conflict resolution policy defined by the service provider; and transmitting to the service provider an error message if the first and second subsets conflict.

2. The method of claim 1, wherein the conflict resolution policy defines reconciling any conflict between the first and second subsets by enabling none, one or both of the first and second subsets of communication services.

3. The method of claim 1, wherein the wireless device identifier is stored in a memory device of the wireless device.

4. The method of claim 3, wherein the memory device is a subscriber identity module (SIM).

5. The method of claim 1, wherein the communication services include electronic mail services.

6. The method of claim 1, wherein the provisioning system is operated by a second service provider.

7. A system for provisioning wireless devices on a wireless network, comprising:

a processor coupled to memory and an interface to the wireless network and adapted for:

identifying, using a received wireless device identifier of the wireless device, a first default subset of unactivated communication services which have been authorized by a service provider to be available for use with the wireless device, the authorization of the first default subset of unactivated communication services being specific to the wireless device;

identifying, using the wireless device identifier, a subscriber associated with the wireless device, the service provider having pre-assigned a second subset of communication services to the subscriber, the pre-assignment of the second subset of communication services being specific to the subscriber;

reconciling any conflict between the first and second subsets of communication services in accordance with a conflict resolution policy defined by the service provider; and transmitting to the service provider an error message if the first and second subsets conflict.

8. The system of claim 7, wherein the conflict resolution policy defines reconciling any conflict between the first and second subsets by enabling none, one or both of the first and second subsets of communication services.

9. The system of claim 7, wherein the wireless device identifier is stored in a memory device of the wireless device.

10. The system of claim 9, wherein the memory device is a subscriber identity module (SIM).

11. The system of claim 7, wherein the communication services include electronic mail services.

12. The system of claim 7, wherein the system is operated by a second service provider.

13. The system of claim 7, wherein the system is a generic provisioning system for provisioning wireless devices operating on at least two different networks.

14. A computer program product having a computer readable medium tangibly embodying computer executable code for directing a provisioning system to provision wireless devices on a wireless network, said computer program product comprising:

code for identifying, using a received wireless device identifier a first default subset of unactivated communication services which have been authorized by a service provider to be available for use with the wireless device, the authorization of the first default subset of unactivated communication services being specific to the wireless device;

code for identifying, using the wireless device identifier, a subscriber associated with the wireless device, the service provider having pre-assigned a second subset of communication services to the subscriber, the pre-assignment of the second subset of communication services being specific to the subscriber;

code for reconciling any conflict between the first and second subsets of communication services in accordance a conflict resolution policy defined by the service provider; and code for transmitting to the service provider an error message if the first and second subsets conflict.

15. The computer program product of claim 14, wherein the conflict resolution policy defines reconciling any conflict between the first and second subsets by enabling none, one or both of the first and second subsets of communication services.

16. The computer program product of claim 14, wherein the wireless device identifier is stored in a memory device of the wireless device.

17. The computer program product of claim 16, wherein the memory device is a subscriber identity module (SIM).

18. The computer program product of claim 14, wherein the communication services include electronic mail services.

19. The computer program product of claim 14, wherein the provisioning system is operated by a second service provider.

\* \* \* \* \*